Sept. 4, 1962  H. A. PAPPANO ETAL  3,052,865
POWER CORD ADAPTORS
Filed March 2, 1959
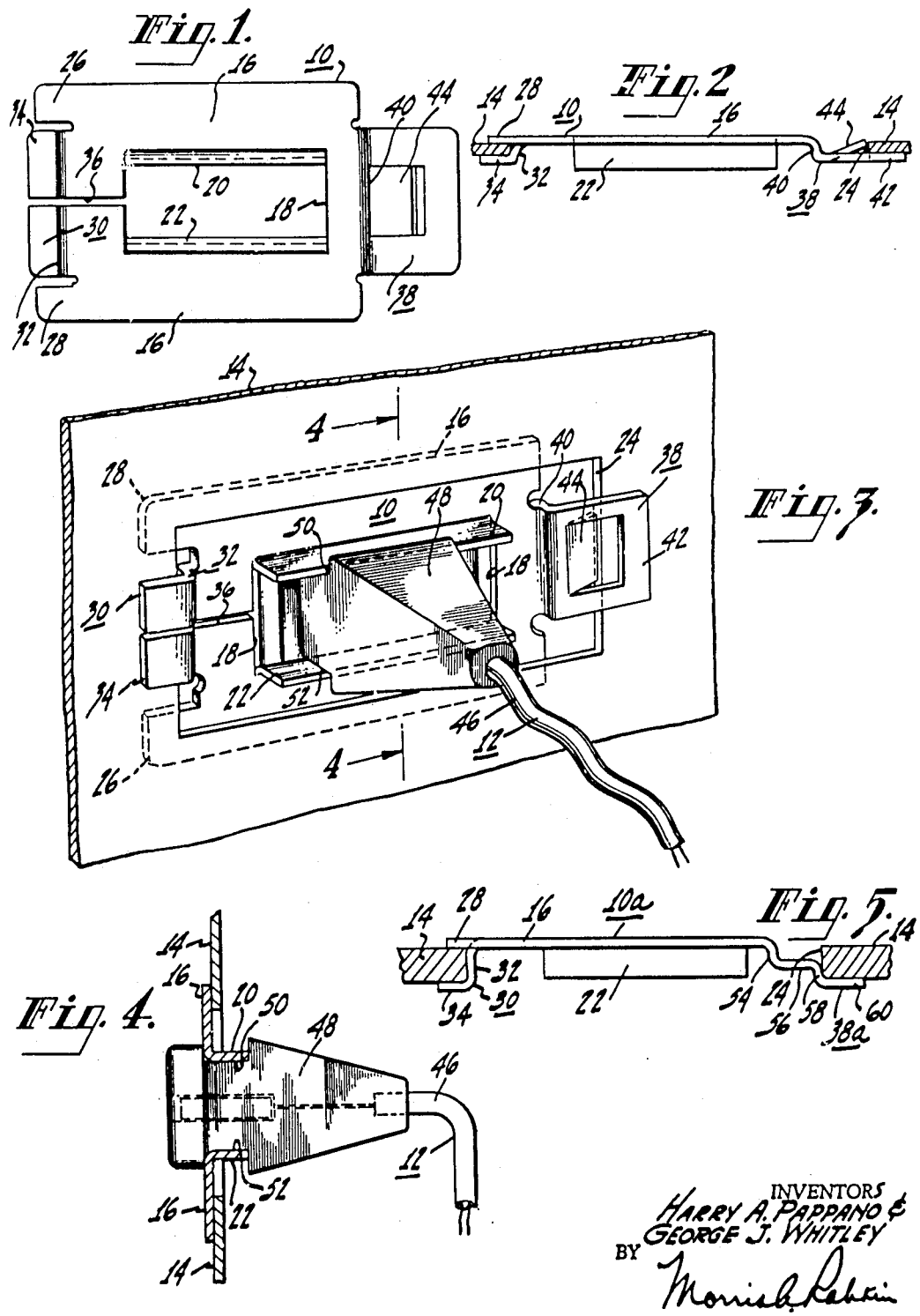
INVENTORS
HARRY A. PAPPANO &
GEORGE J. WHITLEY
BY
ATTORNEY

3,052,865
POWER CORD ADAPTORS
Harry A. Pappano, Riverside, N.J., and George J. Whitley, Philadelphia, Pa., assignors to Radio Corporation of America, a corporation of Delaware
Filed Mar. 2, 1959, Ser. No. 796,551
11 Claims. (Cl. 339—126)

This invention relates to adaptors generally, and more particularly to adaptors of the type used to interlock an electric power cord with a cover for electrical equipment. Power cord adaptors of the present invention are particularly useful for interlocking the power cord of a television receiver with the removable back cover of the receiver.

Certain types of electrical equipment, such as television receivers, for example, require high voltages for their operation. Such equipment, therefore, presents a serious safety hazard if operated with its protective covering removed. It is a safety measure, and in some localities a legal requirement, for the power cord of such equipment to be interlocked with a removable cover so that inexperienced personnel will find this equipment difficult, if not even impossible, to operate with the cover removed.

It had been proposed to rivet the female plug of a power cord to the cover of electrical equipment so that the female plug may engage a male plug within the chassis of the equipment only when the cover is secured to the equipment. While this fixed arrangement is satisfactory in some installations, it is sometimes difficult to align the female plug on the cover with the male plug within the chassis. This difficulty, particularly in old equipment, may arise because of warpage of the cover and/or housing, or, in new equipment, because of a misalignment of the cover with the housing.

Accordingly, it is an object of the present invention to provide improved power cord adaptors for adjustably securing a power cord to a removable cover of electrical equipment.

It is another object of the present invention to provide improved power cord adaptors having an integral structure that may be stamped from a plate of resilient material.

A further object of the present invention is to provide improved power cord adaptors that can be easily snapped into place within an opening in a cover, and which cannot be easily removed without tools or without mutilating the cover to which it is attached.

Still a further object of the present invention is to provide novel power cord adaptors that are relatively simple in construction, inexpensive to manufacture, and highly efficient in use.

In accordance with the present invention, the improved adaptors are constructed to mount a plug adjustably within an opening in a cover or wall. The adaptors may be stamped, preferably from a single sheet or plate of resilient material. Each adaptor comprises a front portion whose height is greater than the height of the opening in the wall. A first side portion extends rearwardly from one side of the front portion for a distance at least as great as the thickness of the wall and then extends outwardly or laterally, substantially parallel to the front portion. A second side portion on the opposite side of the front portion also extends first rearwardly and then outwardly or laterally in a step-wise manner. These side portions are of reduced height in relation to the height of the opening in the wall. The front portion of the plate is formed with a through opening therein, and the plate is formed with a slit from one edge of the plate to the through opening.

With this arrangement, the wire of a power cord may be introduced into the through opening in the adaptor by forceably enlarging the slit and pulling the wire through. A resilient female plug formed with suitably disposed grooves therein may be forced into position until opposite edges of the plate defining the through opening therein seat within the grooves of the plug, thus captivating the plug. The through opening in the adaptor is large enough to permit the plug to slide therein. The adaptor may now be inserted into the opening in the wall by first inserting the second side portion through the opening as far as it will go. Next, the first side portion of the plate is inserted through the opening and the plate is pushed back until the rearwardly extending portion of the first side portion touches one edge of the wall defining the opening therein. The second side portion includes means to engage an opposite edge of the wall defining the opening in a manner whereby the adaptor will now be securely snapped in.

When the adaptor is used in conjunction with a relatively thin metal wall, the retaining means comprises a forwardly biased flap. When the adaptor is used with thicker walls, such as a "Masonite" wall, for example, the retaining means is a step portion of the second side portion.

The novel features of the present invention, both as to its organization and method of utilization, as well as additional objects and advantages thereof, will be understood more readily from the following description, when considered in connection with the accompanying drawing in which similar reference characters represent similar parts and in which:

FIG. 1 is a front elevational view of one form of power cord adaptor in accordance with the present invention;

FIG. 2 is a bottom end view of the adaptor of FIG. 1 showing how its side portions are engaged within a cover;

FIG. 3 is a rear, perspective view of the adaptor showing a power cord plug slidably captivated within an opening therein, and showing the adaptor slidably inserted within an opening in a cover;

FIG. 4 is cross-sectional view of the adaptor shown in FIG. 3, taken along the plane of the line 4—4, and viewed in the direction indicated by the arrows; and FIG. 5 is a bottom end view of another embodiment of an adaptor according to the present invention, this embodiment being especially suitable for use with relatively thick walls.

Referring, now, to FIGS. 1, 2, 3, and 4 there is shown an adaptor 10 for interlocking a power cord 12 adjustably with a wall 14. The adaptor 10 may be made by stamping from a single sheet or plate of resilient material, such as spring steel. The adaptor 10 comprises a planar front portion 16 of substantially quadrangular shape. The front portion 16 is formed with a relatively large through opening 18, also of quadrangular shape. Each of a pair of upper and lower, parallelly disposed flanges 20 and 22 extends rearwardly from the front portion 16, these flanges comprising, respectively, the upper and lower edges of the plate that defines the opening 18.

Referring, now, to FIG. 3, the adaptor 10 is shown disposed within an opening 24 within a relatively thin wall 14. The wall 14 may be the cover of a television receiver, for example, and may be made of perforated sheet metal, as an illustration. The height of the front portion 16 is greater than the height of the quadrangular opening 24 in the wall 14, as clearly seen in FIG. 3.

The front portion 16 of the adapter 10 is formed with two spaced-apart tabs 26 and 28 extending outwardly or laterally from one side of the front portion 16. A first side portion 30 of the adaptor 10 comprises a portion 32 extending rearwardly from the front portion 16 and then a portion 34 extending laterally from the portion 32 substantially parallel to the front portion 16. The adaptor 10 is formed with a slit 36 extending from the peripheral edge of the adaptor at which the portion 34 terminates to the through opening 18 in the front portion 16 thereof. The slit 36, as illustrated herein, extends through the first side portion 30 and through a part of the front portion 16. There are thus provided two, slightly separated tabs in the portions 34.

A second side portion 38 of the plate forming the adaptor 10 extends rearwardly and then outwardly or laterally in a stepwise manner. Thus the second portion 38 comprises one step, namely, portion 40 extending rearwardly from the front portion 16 and a portion 42 extending outwardly or laterally from the portion 40 substantially parallel to the front portion 16. The portion 42 of the second side portion 38 is formed with a forwardly and outwardly biased flap 44. The flap 44 comprises wall engaging stop means hereinafter to be described in greater detail.

The first side portion 30 extending rearwardly and outwardly from one side of the front portion 16 and the second side portion 38 extending rearwardly and outwardly from the opposite side of the front portion 16 are of reduced height in relation to the height of the quadranglar opening 24 in the wall 14. Thus, the adapter 10 is floatingly mounted in opening 24 and can be moved up and down freely within the opening 24 when disposed therein, as can be seen readily from FIG. 3.

The power cord 12, comprising a wire cable 46 and a female plug 48, may be slidably captivated within the opening 18 in the front section 16 of the adaptor. This can be done by first displacing relative to each other the resilient tabs in the portion 34 out of a common plane to thereby enlarge the slit 36. The wire cable 46 of the power cord 12 can then be inserted through the slit 36 into the opening 18. The resilient tabs are then released and the female plug 48 of the power cord 12 can now be captivated within the opening 18 by pushing its tapered body between the flanges 20 and 22 until they seat themselves in oppositely disposed grooves 50 and 52 in the female plug 48, as shown in FIG. 4. The opening 18 is wider than necessary for the dimensions of the plug 48 so that the plug 48 may slide in a horizontal direction while in its captivated position.

The utilization of the adaptor 10 for interlocking the power cord 12 with the cover or wall 14 will now be explained. The plug 48 of the cord 12 is inserted within the opening 18 of the adaptor 10 in the manner explained heretofore. The second side portion 38 in the adaptor 10 is now inserted through the opening 24 of the wall 14, in a direction from the front of the wall 14 to the rear of the wall 14, as shown in FIG. 3. The adaptor 10 is now moved to one edge, that is, to the extreme right as viewed in FIG. 3. The first side portion 30 of the adaptor 10 is now forced through the opening 24. This is possible by reason of the resilience of the adaptor. The adaptor 10 is then pushed to the extreme left until the rearwardly extending portion 32 of the first side portion 30 abuts against the left hand edge of the wall 14 defining the opening 24, as illustrated in FIG. 3. The forwardly biased flap 44 will now snap forward and act as a stop means to prevent the adapter 10 from moving to the right, as shown in FIG. 2. Thus, the flap 44 acts as a latching device to retain the adaptor 10, against facile or accidental removal from the wall 14. The power cord 12 has now been slidably captivated within the opening 18 of the adaptor 10, allowing sidewise or horizontal motion therein. The adaptor 10, having been snapped into the hole 24 in the wall 14 with its side portion 30 and its tabs 26 and 28 loosely engaging the opposite surfaces of the wall 14, is now free for vertical motion in the hole 24. The horizontal and vertical motions afforded the female plug 48 by the adaptor 10 enable the plug 48 to engage with a male plug within the chassis (not shown) that the cover 14 is adapted to protect even if the male and female plug members are originally somewhat misaligned.

Referring, now, to FIG. 5, there is shown another embodiment 10a of the adaptor, in accordance with the present invention, for use with relatively thicker walls than the metal walls usually used in conjunction with the adaptor 10. The adaptor 10a is adapted for use with "Masonite" walls, for example. The same reference characters are used for similar parts in the adaptor 10a as were used for the adaptor 10. The adaptor 10a differs from the adaptor 10 in that the second side portion 38a extends rearwardly and outwardly from the front portion 16 in two steps. The first step comprises a rearwardly extending step portion 54 and an outwardly extending portion 56. The second step of the second side portion 38a comprises a step portion 58 which extends rearwardly from the portion 56 and a laterally outwardly extending portion 60.

The utilization of the adaptor 10a is substantially the same as that of the adaptor 10, and the procedure for inserting the adaptor 10a within the opening 24 in a wall 14 is substantially the same as described for the adaptor 10. The wall engaging means on the second side portion 38a is the rearwardly extending step portion 58 which snaps into place and prevents the adaptor 10a from moving in a horizontal direction, but does not prevent movement in a vertical direction.

From the foregoing description, it will be apparent that there have been provided, in accordance with the present invention, improved adaptors for interlocking a power cord with a wall or cover for electrical equipment. The improved adaptors described herein are relatively simple in construction and operation and may be made from a stamping of a unitary sheet or plate of resilient material. The female plug of a power cord may be inserted easily within the adaptor, and the adaptor may be inserted easily within an opening in a wall without the use of any tools. Once inserted, however, the adaptors cannot be removed without the use of tools. This provides insurance against accidental removal of the adaptor from the wall.

While only two embodiments of the adaptor have been shown and described, other variations of the adaptor coming within the spirit of this invention will, no doubt, readily suggest themselves to those skilled in the art. For example, the slit 36, instead of being provided along the side portion 30 to lead to the opening 18, may be provided in one or the other of the horizontal parts of the front portion 16, either above the flange 20 or below the flange 22, and continuing along the adjoining flange 20 or 22, as the case may be, to communicate with the opening 18. A slit so located will also serve to permit easy insertion of the wire cable 46 into the opening 18. Other variations within the scope of the present invention will, no doubt, readily suggest themselves to those skilled in the art. Hence, it is desired that the foregoing shall be considered merely as illustrative and not in a limiting sense.

What is claimed is:

1. An adaptor adapted to be captivated adjustably over a through opening in a wall, said adaptor comprising a plate having a front portion formed with an opening therein, a first side portion of said plate comprising means extending rearwardly for a predetermined distance from one side of said front portion and then laterally outwardly in a direction substantially parallel to said plate, a second side portion of said plate comprising step portions extending step-wise rearwardly and laterally outwardly from the opposite side of said front portion, said front portion having a pair of spaced-apart tabs on said one side thereof, and said plate being formed with a slit from a peripheral edge thereof and communicating with said opening, said front portion and said tabs being in the same plane with each other, portions of said first and said second side portions being adapted to be slidably retained between portions of said wall defining said through opening, whereby said adaptor may be slidably retained on said wall with said tabs against one side of said wall and the laterally outwardly extending portions of said first and said second side portions against the other side of said wall, and said slit providing a passage for passing a cable therethrough, whereby a plug connected to said cable may be pulled into said opening in said front portion for captivation therein.

2. An adaptor adapted to be captivated adjustably over a through opening in a wall, said adaptor comprising a plate having a front portion formed with an opening therein, a first side portion of said plate extending rearwardly for a predetermined distance from one side of said front portion and then laterally outwardly, a second side portion of said plate having a step portion extending step-wise rearwardly and then laterally outwardly from the opposite side of said front portion, said plate being formed with a slit extending from the peripheral edge of said plate and communicating with said opening, said front portion having a pair of spaced-apart tabs on said one side thereof, and said second side portion including retaining means extending forwardly from said step portion, portions of said first and said second side portions being adapted to be slidably retained between portions of said wall defining said through opening, whereby said adaptor may be slidably retained on said wall with said tabs against one side of said wall and the laterally outwardly extending portions of said first and said second side portions against the other side of said wall, and said slit providing a passage for passing a cable therethrough, whereby a plug connected to said cable may be pulled into said opening in said front portion for captivation therein.

3. An adaptor adapted to be captivated loosely over a through opening in a wall, said adaptor comprising a unitary plate having a substantially planar front portion formed with an opening therein, a first side portion of said plate extending rearwardly for a predetermined distance from one side of said front portion and then laterally outwardly substantially parallel to said front portion, a second side portion of said plate extending step-wise rearwardly and then laterally outwardly from the opposite side of said front portion and having a part substantially parallel to the plane of said front portion at substantially said predetermined distance therefrom, said front portion and said first side portion being formed with a slit extending from the peripheral edge of said plate and communicating with said opening, said plate including a pair of oppositely disposed flanges extending transversely from said front portion and defining opposite sides of said opening, and said second side portion including retaining means extending forwardly from said part, portions of said first and said second side portions being adapted to be slidably retained between portions of said wall defining said through opening, whereby said adaptor may be slidably retained on said wall with portion of said front portion against one side of said wall and the laterally outwardly extending portions of said first and said second side portions against the other side of said wall, and said slit providing a passage for passing a cable therethrough, whereby a plug connected to said cable may be pulled into said opening in said front portion for retention between said flanges.

4. A resilient stamping adapted to be captivated loosely over a through opening in a wall, said stamping comprising a unitary plate having a substantially planar front portion formed with an opening therein, a first side portion of said plate extending rearwardly for a predetermined distance from one side of said front portion and then laterally outwardly substantially parallel to said front portion, a second side portion of said plate extending step-wise rearwardly and then laterally outwardly from the opposite side of said front portion and having a part substantially parallel to said front portion at substantially said predetermined distance therefrom, said plate being formed with a slit from its peripheral edge communicating with said opening, said plate including a pair of oppositely disposed flanges extending rearwardly from said front portion and defining opposite sides of said opening, said front portion having a pair of spaced-apart tabs on said one side thereof, and said second side portion including retaining means extending forwardly from said part, portions of said first and said second side portions being adapted to be slidably retained between portions of said wall defining said through opening, whereby said stamping may be slidably retained in said wall with said tabs against one side of said wall and the laterally outwardly extending portions of said first and said second side portions against the other side of said wall, said slit providing a passage for passing a cable therethrough, whereby a plug connected to said cable may be pulled into said opening in said front portion for retention between said flanges.

5. An adaptor adapted to be captivated loosely over a through opening in a wall, said adaptor comprising a plate having a substantially quadrangular planar front portion formed with an opening therein, a first side portion and a second side portion of said plate being of reduced height relative to the height of said front portion, said first side portion of said plate extending rearwardly for a predetermined distance from one side of said front portion and then laterally outwardly substantially parallel to said front portion, said second side portion of said plate extending step-wise rearwardly and then laterally outwardly from the opposite side of said front portion and having a part at substantially said predetermined distance from the plane defined by said front portion, said front portion and said first side portion being formed with a slit extending from the peripheral edge of said plate and communicating with said opening, and said part being formed with a flap therein which is biased in a forward direction, portions of said first and said second side portions being adapted to be slidably retained between portions of said wall defining said through opening, whereby said adaptor may be slidably retained on said wall with portions of said front portion against one side of said wall and portions of said laterally outwardly extending side portions against the other side of said wall, a portion of said flap being adapted to engage a portion of said wall defining said through opening to limit the movement of said adaptor in one direction therein.

6. An adaptor adapted to be captivated loosely over a through opening in a wall, said adaptor comprising a unitary plate having a substantially quadrangular planar front portion formed with a substantially quadrangular opening therein, a first side portion of said plate of reduced height relative to said front portion extending rearwardly for a predetermined distance from one side of said front portion and then laterally outwardly substantially parallel to said front portion, a second side portion of said plate of reduced height relative to said front portion extending step-wise rearwardly and then laterally outwardly from the opposite side of said front portion and having a part substantially parallel to said front portion at substantially said predetermined distance from the plane of said front portion, said front portion and said first side portion being formed with a slit extending from the peripheral edge of said plate and communicating with said opening, said plate comprising oppositely disposed flanges extending transversely along said front portion and defining opposite sides of said opening, said front portion having a pair of spaced-apart tabs on said one side thereof, and said part having a forwardly biased flap formed therein, portions of said first and said second side portions being adapted to be slidably retained between portions of said wall defining said through opening, whereby said adaptor may be slidably retained on said wall with said tabs against one side of said wall and portions of said laterally outwardly extending side portions against the other side of said wall, an end portion of said flap being adapted to engage a portion of said wall defining said through opening to limit the motion of said adaptor in one direction therein.

7. An adaptor adapted to be captivated loosely over a through opening in a wall, said adaptor comprising a unitary plate having a substantially planar front portion formed with an opening therein, a first side portion of said plate extending rearwardly for a predetermined distance from one side of said front portion and then laterally outwardly substantially parallel to said front portion, a second side portion of said plate extending step-wise rearwardly and outwardly from the opposite side of said front portion and having a part substantially parallel to the plane of said front portion at substantially said predetermined distance from the plane defined thereby, said plate being formed with a slit extending from the peripheral edge thereof and communicating with said opening and including oppositely disposed flanges extending transversely along said front portion and defining opposite sides of said opening, and said front portion having a pair of spaced-apart tabs on said one side thereof, said second side portion including at least two steps, portions of said first and said second side portions being adapted to be slidably retained between portions of said wall defining said through opening, whereby said adaptor may be slidably retained on said wall with said tabs against one side of said wall and the laterally outwardly extending portions of said first and said second side portions against the other side of said wall, said slit providing a passage for passing a cable therethrough, whereby a plug connected to said cable may be pulled into said opening in said front portion for retention between said flanges, and one of said two steps of said second side portion being adapted to engage a portion of said wall defining said through opening, whereby to limit the movement of said adaptor in one direction with respect to said through opening.

8. An adaptor for securing a plug adjustably within an opening in a wall, said adaptor comprising a unitary plate having a planar front portion whose height is greater than the height of said opening, a first side portion of said plate having a portion extending rearwardly from one side of said front portion for a distance at least as great as the thickness of said wall and then a portion extending laterally outwardly, a second side portion of said plate extending step-wise rearwardly and laterally outwardly from the opposite side of said front portion and having at least one part spaced at substantially said distance from the plane of said front portion, said front portion being formed with a through opening, said plate being formed with a slit extending from the peripheral edge thereof and communicating with said through opening, said first side portion and said second side portion each being of reduced height relative to the height of said opening in said wall, and said second side portion including means to engage one edge of said wall defining said opening when said rearwardly extending portion of said first side portion is substantially engaged with an opposite edge of said wall defining said opening, portions of said first and said second side portions being adapted to be slidably retained between portions of said wall defining said opening, whereby said adaptor may be slidably retained in said wall with portions of said front portion against one side of said wall and portions of said laterally outwardly extending side portions engaging the other side of said wall, said slit providing a passage for passing a cable therethrough, whereby a plug on said cable may be pulled into said through opening for retention therein.

9. An adaptor for securing a plug adjustably within a quadrangular opening in a wall, said adaptor comprising a unitary plate having a substantially quadrangular planar front portion whose height is greater than the height of said opening, a first side portion of said plate having a portion extending rearwardly from one side of said front portion for a distance at least as great as the thickness of said wall and then a portion extending laterally outwardly substantially parallel to said front portion, a second side portion of said plate extending step-wise rearwardly and outwardly from the opposite side of said front portion and having at least one part spaced at said distance, said front portion being formed with a through opening, said first side portion being formed with a slit extending from the peripheral edge of said plate and communicating with said through opening, said first side portion and said second side portion each being of reduced height relative to the height of said opening in said wall, said front portion comprising a pair of tabs extending laterally outwardly and spaced from each other a distance greater than the height of said first side portion, said second side portion comprising means to engage one edge of said wall defining said opening therein when said rearwardly extending portion of said first side portion is substantially engaged with an opposite edge of said wall defining said opening therein, and said plate comprising a pair of spaced-apart flanges extending transversely along said front portion and defining opposite sides of said through opening, portions of said first and said second side portions being adapted to be slidably retained between portions of said wall defining said quadrangular opening, whereby said adaptor may be slidably retained on said wall with said tabs against one side of said wall and portions of said laterally outwardly extending side portions engaging the other side of said wall.

10. An adaptor for securing a plug adjustably within a quadrangular opening in a wall, said adaptor comprising a unitary resilient plate having a substantially quadrangular front portion whose height is greater than the height of said opening, a first side portion of said plate having a portion extending rearwardly from one side of said front portion for a distance at least as great as the thickness of said wall and then a portion extending laterally outwardly substantially parallel to said front portion, a second side portion of said plate extending step-wise rearwardly and laterally outwardly from the opposite side of said front portion and having at least one part spaced at substantially said distance from the plane defined by said front portion, said front portion being formed with a through opening, said plate being formed with a slit extending from a peripheral edge and communicating with said through opening, said first side portion and said second side portion each being of reduced height and relative to the height of said opening in said wall, said front portion comprising a pair of tabs extending outwardly and spaced from each other a distance greater than the height of said first side portion, said step portion including a forwardly and outwardly extending flap therein to engage one edge of said wall defining said opening when said rearwardly extending portion of said first side portion is substantially engaged with an opposite edge of said wall defining said opening therein, and said plate including a pair of spaced-apart flanges extending transversely along said front portion and defining said through opening, portions of said first and said second side portions being adapted to be slidably retained between portions of said wall defining said opening, whereby said adaptor may be slidably retained on said wall with said tabs against one side of said wall and portions of said first and said second side portions against the other side of said wall.

11. An adaptor for securing a plug adjustably within a quadrangular opening in a wall, said adaptor comprising an integral plate having a substantially quadrangular front portion whose height is greater than the height of said opening, a first side portion of said plate having a portion extending rearwardly from one side of said front portion for a distance at least as great as the thickness of said wall and then a portion extending laterally outwardly substantially parallel to said front portion, a second side portion of said plate extending step-wise rearwardly and laterally outwardly from the opposite side of said front portion and having at least one part spaced at said distance from the plane defined by said front portion, said front portion being formed with a through opening, said plate being formed with a slit extending from the peripheral edge thereof and communicating with said through opening, said first side portion and said second side portion each being of reduced height relative to the height of said opening in said wall, said front portion comprising a pair of tabs extending outwardly and spaced from each other a distance greater than the height of said first side portion, said second side portion including another part stepped in relation to said first named part to engage one edge of said wall defining said opening when said rearwardly extending portion of said first side portion is substantially engaged with an opposite edge of said wall defining said opening therein, and said plate comprising a pair of spaced-apart flanges extending transversely along said front portion and defining opposite sides of said through opening, portions of said first and said second side portions being adapted to be slidably retained between portions of said wall defining said opening, whereby said adaptor may be slidably retained on said wall with said tabs against one side of said wall and portions of said first and said second side portions against the other side of said wall.

References Cited in the file of this patent

UNITED STATES PATENTS

| | | |
|---|---|---|
| 2,166,916 | Lombard | July 18, 1939 |
| 2,168,721 | Tinnerman | Aug. 8, 1939 |
| 2,200,047 | Tinnerman | May 7, 1940 |
| 2,616,142 | Tinnerman | Nov. 4, 1952 |
| 2,627,385 | Tinnerman | Feb. 3, 1953 |
| 2,840,792 | Herrold | June 24, 1958 |
| 2,853,113 | Flora | Sept. 23, 1958 |
| 2,869,094 | Francis | Jan. 13, 1959 |
| 2,906,159 | Meyer | Sept. 29, 1959 |